(12) United States Patent
Sato

(10) Patent No.: US 11,872,448 B2
(45) Date of Patent: Jan. 16, 2024

(54) INFORMATION PROCESSING SYSTEM, INFORMATION PROCESSING METHOD, AND PROGRAM

(71) Applicant: SEIKO EPSON CORPORATION, Tokyo (JP)

(72) Inventor: Naoya Sato, Tomi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/087,764

(22) Filed: Dec. 22, 2022

(65) Prior Publication Data

US 2023/0201663 A1 Jun. 29, 2023

(30) Foreign Application Priority Data

Dec. 24, 2021 (JP) ................. 2021-210837

(51) Int. Cl.
*G06Q 30/00* (2023.01)
*A63B 24/00* (2006.01)
*G06Q 30/0207* (2023.01)

(52) U.S. Cl.
CPC ..... *A63B 24/0062* (2013.01); *G06Q 30/0224* (2013.01); *A63B 2024/0065* (2013.01); *A63B 2024/0068* (2013.01); *A63B 2024/0071* (2013.01)

(58) Field of Classification Search
CPC ........ A63B 24/0062; A63B 2024/0065; A63B 2024/0068; A63B 2024/0071; G06Q 30/0224
See application file for complete search history.

(56) References Cited

U.S. PATENT DOCUMENTS

| | | | |
|---|---|---|---|
| 2012/0166257 A1 | 6/2012 | Shiragami et al. | |
| 2013/0332286 A1* | 12/2013 | Medelius | A61B 5/6829 705/14.66 |
| 2015/0081060 A1* | 3/2015 | Hwang | G16H 20/10 700/91 |
| 2018/0043210 A1* | 2/2018 | Niehaus | A61B 5/1118 |
| 2021/0014582 A1* | 1/2021 | Case, Jr. | G06Q 30/0639 |

FOREIGN PATENT DOCUMENTS

| | | |
|---|---|---|
| CN | 204833602 U * | 12/2015 |
| JP | 2012137930 | 7/2012 |

* cited by examiner

*Primary Examiner* — Meredith A Long
(74) *Attorney, Agent, or Firm* — JCIPRNET

(57) ABSTRACT

An information processing system includes an electronic apparatus including a detector that detects one or more pieces of data indicating an exercise type of a user, the electronic apparatus being attached to an in-use shoe used by the user, and an information processing device including an identification part that identifies the exercise type of the user based on the one or more pieces of data detected by the detector and an output part that outputs applicable shoe information about an applicable shoe corresponding to the type identified by the identification part.

18 Claims, 10 Drawing Sheets

INFORMATION PROCESSING SYSTEM, INFORMATION PROCESSING METHOD, AND PROGRAM

The present application is based on, and claims priority from JP Application Serial Number 2021-210837, filed Dec. 24, 2021, the disclosure of which is hereby incorporated by reference herein in its entirety.

BACKGROUND

1. Technical Field

This disclosure relates to an information processing system, an information processing method, and a program.

2. Related Art

Technologies for supporting people to perform exercise have been researched and developed.

With this regard, an exercise management device that issues a coupon offering a discount rate on shoes able to be used by a user for exercise depending on the amount of exercise of the user is known (see JP-A-2012-137930).

Here, the exercise management device described in JP-A-2012-137930 is not able to identify the exercise type performed by a user. For this reason, the exercise management device sometimes issues a coupon for shoes that are not suitable for the exercise performed by a user. Such a problem may also arise in providing information of applicable shoes-related information other than coupons.

SUMMARY

According to an aspect of the present disclosure to solve the above-described problem, an information processing system includes an electronic apparatus that includes a detector configured to detect one or more pieces of data indicating an exercise type of a user and that is attached to an in-use shoe used by the user, and an information processing device that is an identification part configured to identify the exercise type of the user based on the one or more pieces of data detected by the detector and an output part configured to output applicable shoe information about an applicable shoe corresponding to the exercise type identified by the identification part.

In addition, according to another aspect of the present disclosure, an information processing method of an information processing system including an electronic apparatus that is attached to an in-use shoe used by a user and an information processing device that transmits and receives information to and from the electronic apparatus is an information processing method including a first step of detecting, by the electronic apparatus, one or more pieces of data indicating an exercise type of the user, a second step of identifying, by the information processing device, the exercise type of the user based on the one or more pieces of data detected in the first step, and a third step of outputting, by the information processing device, applicable shoe information about an applicable shoe corresponding to the exercise type identified in the second step.

In addition, according to another aspect of the present disclosure, a program causes a computer of an information processing system including an electronic apparatus that is attached to an in-use shoe used by a user and an information processing device that transmits and receives information to and from the electronic apparatus, to execute steps including a first step of detecting one or more pieces of data indicating an exercise type of the user, a second step of identifying the exercise type of the user based on the one or more pieces of data detected in the first step, and a third step of outputting applicable shoe information about an applicable shoe corresponding to the exercise type identified in the second step.

DESCRIPTION OF EXEMPLARY EMBODIMENTS

Embodiments

Exemplary embodiments of the present disclosure will be described below with reference to the drawings.

Overview of Information Processing System

First, an overview of an information processing system according to an embodiment will be described.

The information processing system according to an embodiment includes an electronic apparatus and an information processing device. The electronic apparatus has a detector that detects one or more pieces of data indicating the exercise type of a user, and is attached to a shoe used by the user. The information processing device includes an identification part that identifies the exercise type of the user based on one or more pieces of data detected by the detector, and an output part that outputs applicable shoe information about an applicable shoe corresponding to the exercise type identified by the identification part. In this way, the information processing system can provide information about the shoe suitable for the exercise performed by the user.

A configuration of the information processing system and processing performed by the information processing system according to an embodiment will be described in detail below.

Configuration of Information Processing System

Hereinafter, a configuration of the information processing system according to an embodiment will be described exemplifying an information processing system 1.

Figure 1:
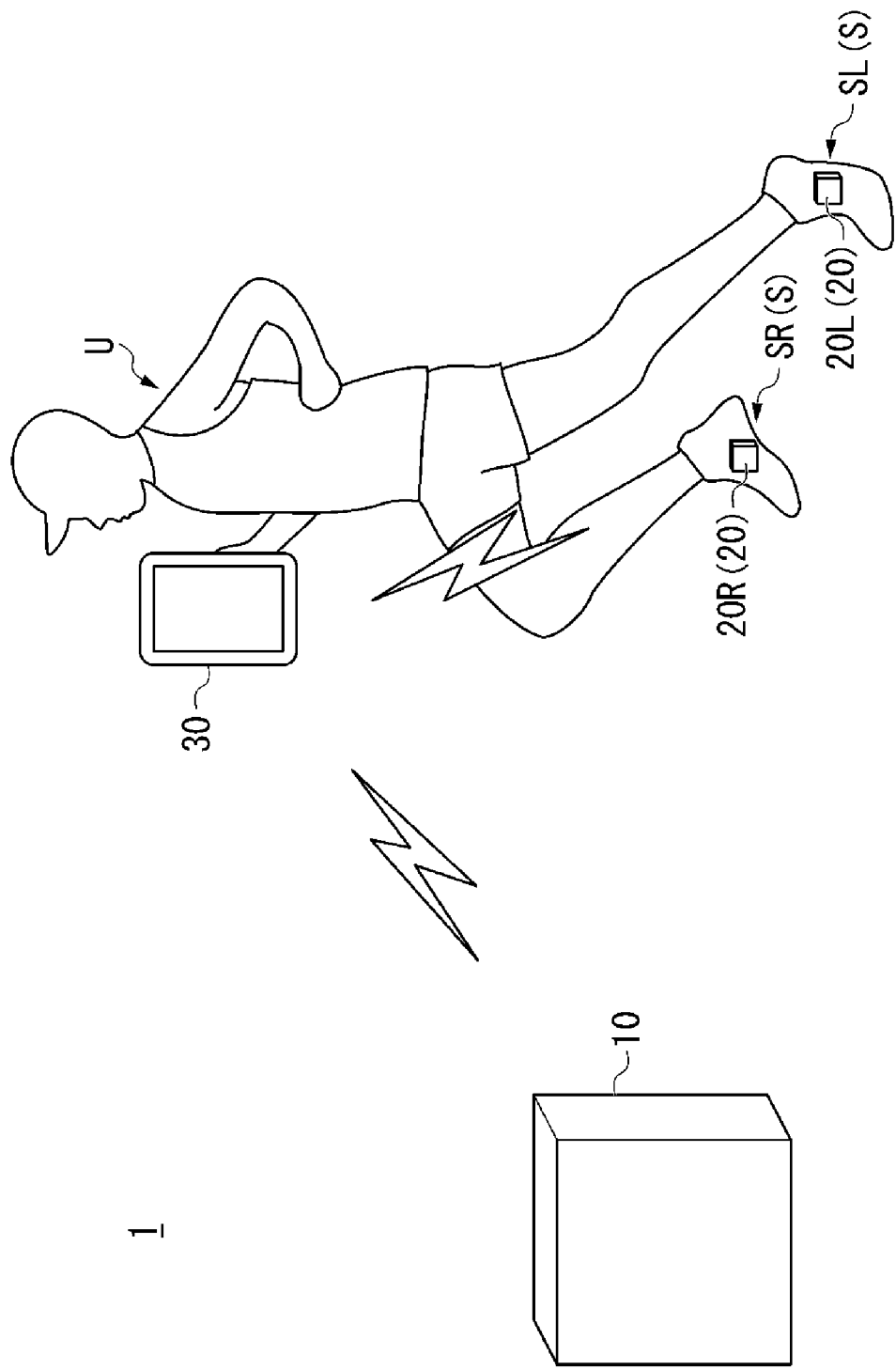
FIG. 1 is a diagram illustrating an example of a configuration of an information processing system 1.

FIG. 1 is a diagram illustrating an example of a configuration of the information processing system 1. Further, as an example, a case in which a user of the information processing system 1 is a user U illustrated in FIG. 1 will be described below. The user U may be any person as long as he or she performs exercise.

The information processing system 1 identifies the exercise type of the user U, and provides the user U with information about a tool corresponding to the identified exercise type among the tools being used by the user U in the exercise. Although the tool corresponding to the exercise type identified by the information processing system 1 is, for example, a tool suitable for the exercise type, a tool that is estimated to be suitable for the exercise type, or the like, it is not limited thereto.

The tools used in the user U in the exercise are, but not limited to, for example, shoes, sportswear, bats, gloves, golf clubs, and the like. In the following, a case in which the exercise type performed by the user U is any of the four exercise types including running, walking, trail running, and mountain climbing will be described as an example. In addition, in the following, the exercise performed by the user U will be referred to as target exercise for convenience of description. Furthermore, in the following, the type of target exercise will be referred to as a target exercise type for convenience of description. Furthermore, in the following, the four types of exercise including running, walking, trail running, and mountain climbing will be referred to collectively as target exercise type candidates as long as there is no need to distinguish the four types of exercise from each other. In addition, a case in which a tool used by the user U in the target exercise is shoes will be described as an example. In this case, the information processing system 1 identifies whether a target exercise type is any of the target exercise type candidates, and provides the user U with information about the shoes corresponding to the identified target exercise type. Further, in the following, the shoes corresponding to the target exercise type identified by the information processing system 1 will be referred to as applicable shoes for convenience of description. Furthermore, in the following, information about the applicable shoes will be referred to as applicable shoe information for convenience of description. Although the applicable shoe information is, for example, information indicating a coupon for discount on the sales price of the applicable shoes, information about the release of the latest model of the applicable shoes, and the like, it is not limited to these. In the following, a case in which the applicable shoe information is information indicating the coupon will be described as an example. Furthermore, in the following, the shoes used by the user U will be referred to as an "in-use shoes S" for convenience of description. Here, the in-use shoes S are configured by a combination of a left in-use shoe SL worn on the left foot of the user U and a right in-use shoe SR worn on the right foot of the user U as illustrated in FIG. 1.

Here, the information processing system 1 detects one or more amounts indicating a type of target exercise. One or more amounts indicating a type of target exercise are one example of one or more pieces of data indicating the exercise type of the user. Thus, each of the one or more amounts described below may be read as one or more pieces of data. The information processing system 1 identifies the type of target exercise based on the detected one or more amounts. More specifically, when the information processing system 1 detects only one certain amount as the one or more amounts, the information processing system 1 identifies a target exercise type candidate indicated by the detected one amount from among the target exercise type candidates as a target exercise type. In addition, when the information processing system 1 detects two or more certain amounts as the one or more amounts, the information processing system 1 identifies target exercise type candidates indicated by a combination of the two or more detected amounts from among the target exercise type candidates as target exercise types.

Although one or more amounts indicating the target exercise type include, for example, a speed amount indicating the speed of the moving user U, an inclination amount indicating the inclination of the road surface on which the user U is moving, and the like, the amounts are not limited thereto. In the following, a case in which one or more amounts indicating the target exercise type are a speed amount and an inclination amount will be described as an example. In this case, for example, if the average speed of the moving user U is equal to or greater than a predetermined speed and the inclination of the road surface on which the user U is moving is less than a predetermined inclination, the information processing system 1 determines that the target exercise type is running. Although the predetermined speed may be, for example, 7 km/h, it may be a slower speed than 7 km/h or faster than 7 km/h. Although the predetermined inclination may be, for example, 37%, that is, an inclination of approximately 20 degrees with respect to the horizontal plane, it may be an inclination smaller than 37%, or greater than 37%. In addition, in such a case, for example, if the average speed of the moving user U is less than the predetermined speed and the inclination of the road surface on which the user U is moving is less than the predetermined inclination, the information processing system 1 determines that the target exercise type is walking. In addition, in such a case, for example, if the average speed of the moving user U is equal to or higher than the predetermined speed and the inclination of the road surface on which the user U is moving is equal to or greater than the predetermined inclination, the information processing system 1 determines that the target exercise type is trail running. In addition, in such a case, for example, if the average speed of the moving user U is less than the predetermined speed and the inclination of the road surface on which the user U is moving is equal to or greater than the predetermined inclination, the information processing system 1 determines that the target exercise type is mountain climbing.

The information processing system 1 outputs applicable shoe information corresponding to the target exercise type identified in this manner. In this way, the information processing system 1 can provide information about the shoes suitable for the target exercise. In the following, the two amounts including the speed amount and the inclination amount detected by the information processing system 1 as amounts indicating the target exercise type will be referred to collectively as a detection amount for convenience of description. Here, each of the speed amount, the inclination amount, and the detection amount is one example of one or more pieces of data indicating the exercise type of the user. Thus, a speed amount may be read as speed data. In addition, an inclination amount may be read as inclination data. In addition, a detection amount may be read as detection data.

In the example illustrated in FIG. 1, the information processing system 1 includes, for example, an information processing device 10, an electronic apparatus 20 that detects a detection amount, and a mobile terminal 30. Further, in the information processing system 1, the information processing device 10 and the mobile terminal 30 may be configured to be integrated. Furthermore, in the information processing system 1, the electronic apparatus 20 and the mobile terminal 30 may be configured to be integrated. In addition, the information processing system 1 may be configured not to include the mobile terminal 30.

The information processing device 10 may be any information processing device as long as the information processing device can function as a server. Although the information processing device 10 is, for example, a desktop personal computer (PC), a workstation, or the like, it is not limited thereto.

When a predetermined information reception start condition is satisfied, the information processing device 10 starts receiving, from the electronic apparatus 20, detection amount information indicating a detection amount detected by the electronic apparatus 20. The detection amount information is a combination of speed amount information indicating a speed amount and inclination amount information indicating an inclination amount. Speed amount information is associated with first time information indicating the time at which the speed amount was detected. Inclination amount information is associated with second time information indicating the time at which the inclination amount was detected. The information reception start condition may be any condition as long as the condition is a trigger to start reception of the detection amount information from the electronic apparatus 20. In the following, a case in which the information reception start condition is that the information processing device 10 should have received target exercise start information from the mobile terminal 30 will be described as an example. The target exercise start information is information indicating that the target exercise has been started. In this case, the information processing device 10 receives detection amount information from the electronic apparatus 20 via the mobile terminal 30 each time a predetermined sampling period elapses after receiving the target exercise start information from the mobile terminal 30, for example. Further, the information processing device 10 may be configured to receive the detection amount information from the electronic apparatus 20 through active sensing, receive the detection amount information from the electronic apparatus 20 through passive sensing, or receive the detection amount information using other methods each time the predetermined sampling period elapses after receiving the exercise start information. In addition, the electronic apparatus 20 may be configured to transmit the speed amount information and the inclination amount information to the information processing device 10 at different timings. In the following, a case in which the electronic apparatus 20 transmits the speed amount information and the inclination amount information to the information processing device 10 at the same timing as detection amount information will be described as an example.

The information processing device 10 stores the received detection amount information in chronological order each time the detection amount information is received. In other words, the information processing device 10 stores the speed amount information included in the received detection amount information in chronological order based on first time information associated with the speed amount information each time the detection amount information is received, and stores the inclination amount information included in the received detection amount information in chronological order based on second time information associated with the inclination amount information. The information processing device 10 repeats such reception of the detection amount information and storage of the detection amount information until a predetermined information reception completion condition is satisfied. In other words, the information processing device 10 completes the reception of the detection amount information and the storage of the detection amount information when the information reception completion condition is satisfied. The information reception completion condition may be any condition as long as the condition is a trigger to complete the reception of the detection amount information from the electronic apparatus 20. In the following, a case in which the information reception completion condition is that the information processing device 10 receives target exercise completion information from the mobile terminal 30 will be described as an example. As described above, the information processing device 10 can store the detection amount information in chronological order within the period in which the target exercise is performed.

Here, when a preset reset condition is satisfied, the information processing device 10 removes all of the detection amount information stored in chronological order. The reset condition may be any condition as long as the condition is a trigger for the information processing device 10 to delete all of the detection amount information stored in chronological order. In the following, the reset condition is that information indicating that the shoes used by the user U in the target exercise were changed has been received from the mobile terminal 30 as an example. In this case, when the mobile terminal 30 has received, the user U, an operation indicating that the shoes used by the user U in the target exercise were changed, the mobile terminal 30 transmits the information to the information processing device 10.

In addition, the information processing device 10 performs processing as described below each time the detection amount information is stored in the period from when the target exercise start information is received to when the target exercise completion information is received. When the detection amount information is stored, the information processing device 10 identifies the target exercise type based on the detection amount information stored in chronological order. Then, the information processing device 10 determines whether a predetermined output condition is satisfied based on the detection amount information stored in chronological order and the identified target exercise type. The output condition may be any condition as long as it serves as a trigger to output the applicable shoe information. The output condition will be described below in detail. If it is determined that the output condition is satisfied, the information processing device 10 identifies the applicable shoes corresponding to the identified target exercise type. After identifying the applicable shoes, the information processing device 10 generates applicable shoe information about the identified applicable shoes. After generating the applicable shoe information, the information processing device 10 performs output processing to output the generated applicable shoe information. In this way, the information processing device 10 can provide information about shoes suitable for the target exercise. The information processing device 10 repeats the processing described above within the corresponding period each time the detection amount information is stored. Further, the detection amount information stored in chronological order may or may not include detection amount information stored before the period. Whether the detection amount information stored in chronological order includes detection amount information stored before the period is determined depending on whether the reset condition is satisfied immediately before the period starts.

The electronic apparatus 20 includes a left electronic apparatus 20L attached to the left in-use shoe SL and a right electronic apparatus 20R attached to the right in-use shoe SR. Each of the left electronic apparatus 20L and the right electronic apparatus 20R transmits detection amount information to the information processing device 10 separately via the mobile terminal 30. Thus, the information processing device 10 practically receives two pieces of detection amount information each time a predetermined sampling period elapses. In this case, for example, the information processing device 10 calculates the average value for each of the speed amount and the inclination amount based on the detection amount indicated by each of the two pieces of detection amount information, and then generates the detection amount information indicating the calculated two average values as a detection amount. Then, the information processing device 10 stores the generated detection amount information in chronological order. However, the calculation of such average values will be omitted in order to prevent the description from becoming complicated. Thus, in the following, transmission of detection amount information by the left electronic apparatus 20L to the information processing device 10 and transmission of detection amount information by the right electronic apparatus 20R to the information processing device 10 will be referred to collectively as transmission of the detection amount information by the electronic apparatus 20 to the information processing device 10. Further, in the following, a case in which processing performed by the left electronic apparatus 20L and processing performed by the right electronic apparatus 20R are synchronized as one processing operation of the electronic apparatus 20 will be described below as an example. For this reason, the functions of the electronic apparatus 20 will be described as functions of each of the left electronic apparatus 20L and the right electronic apparatus 20R for convenience of description. Further, the left electronic apparatus 20L and the right electronic apparatus 20R may be configured to have the same configuration as each other as in the present embodiment, or may have different configurations from each other as long as the functions of the information processing system 1 described in the present embodiment are not impaired.

The electronic apparatus 20 is an apparatus configured to detect a detection amount and transmit detection amount information indicating the detected detection amount via the mobile terminal 30 to the information processing device 10. Here, the electronic apparatus 20 performs the transmission and/or reception of information with respect to the mobile terminal 30 in wireless communication based on a predetermined first standard. The first standard may be, for example, the standard of Bluetooth (trade name), the standard of Wi-Fi (trade name), or may be another standard for wireless communication.

Further, the electronic apparatus 20 may be an apparatus configured to be integrated with the in-use shoes S, or may be an external apparatus attached to the in-use shoes S. In the following, a case in which the electronic apparatus 20 is an external apparatus attached to the in-use shoes S will be described as an example. In this case, the electronic apparatus 20 is attached to, for example, a sole of the in-use shoes S, a pocket on the heel side of the in-use shoes S, or the like.

The mobile terminal 30 transmits various requests to the information processing device 10, and receives various types of information from the information processing device 10 as responses to the requests. The mobile terminal 30 also transmits various requests to the electronic apparatus 20 and controls the electronic apparatus 20. In addition, upon receiving detection amount information from the electronic apparatus 20, the mobile terminal 30 transmits the received detection amount information to the information processing device 10. In other words, the mobile terminal 30 relays the transmission and reception of the detection amount information between the electronic apparatus 20 and the information processing device 10.

The mobile terminal 30 is an information processing terminal that can be carried by the user U, for example, a multi-function mobile telephone terminal (smartphone), a tablet PC, a personal digital assistant (PDA), a smart watch, a head-mounted display, or the like, however, it is not limited thereto.

The mobile terminal 30 performs transmission and/or reception of information with respect to the information processing device 10 in wireless communication based on a predetermined second standard. The second standard may be, for example, the standard of Long Term Evolution (LTE) or the like, the standard of Wi-Fi (trade name), or may be another standard for wireless communication.

Hardware Configuration of Information Processing Device

Figure 2:
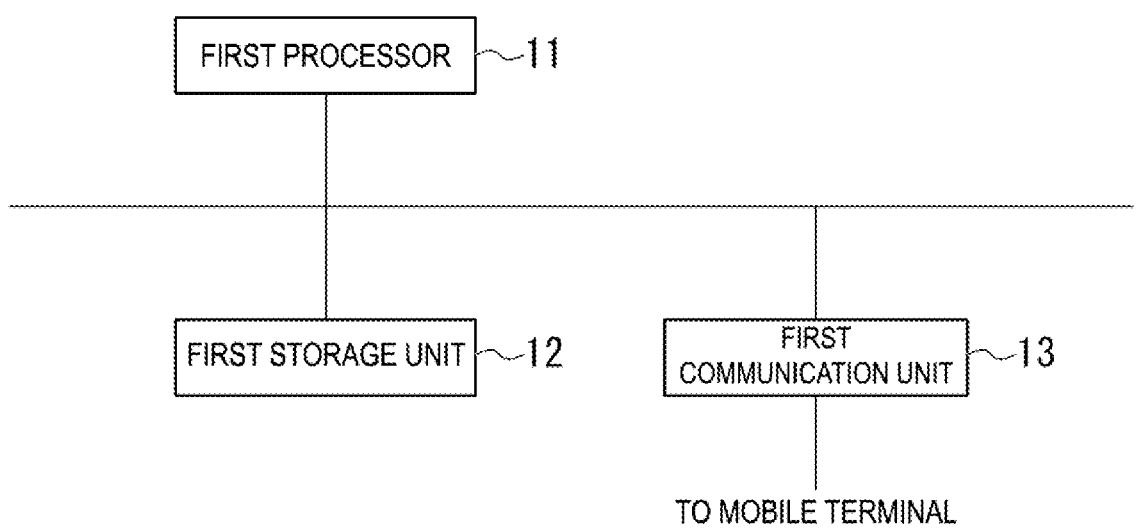
FIG. 2 is a diagram illustrating an example of a hardware configuration of an information processing device 10.

Next, a hardware configuration of the information processing device 10 will be described with reference to FIG. 2. FIG. 2 is a diagram illustrating an example of a hardware configuration of the information processing device 10.

The information processing device 10 includes, for example, a first processor 11, a first storage unit 12, and a first communication unit 13. These constituent components are communicatively connected to each other via a bus. The information processing device 10 also communicates with the mobile terminal 30 via the first communication unit 13.

The first processor 11 is, for example, a central processing unit (CPU). Further, the first processor 11 may be another processor such as a field programmable gate array (FPGA), instead of a CPU. The first processor 11 executes various programs stored in the first storage unit 12.

The first storage unit 12 is a storage device including, for example, a hard disk drive (HDD), a solid state drive (SSD), an electronically erasable programmable read only memory (EEPROM), a read only memory (ROM), a random access memory (RAM), or the like. Further, the first storage unit 12 may be an externally mounted storage device coupled by a digital input/output port such as a Universal Serial Bus (USB) or the like instead of those built into the information processing device 10. The first storage unit 12 stores various types of information, various images, and various programs to be processed by the information processing device 10.

The first communication unit 13 is, for example, a communication device including an antenna for wireless communication or the like.

Hardware Configuration of Electronic Apparatus

Figure 3:
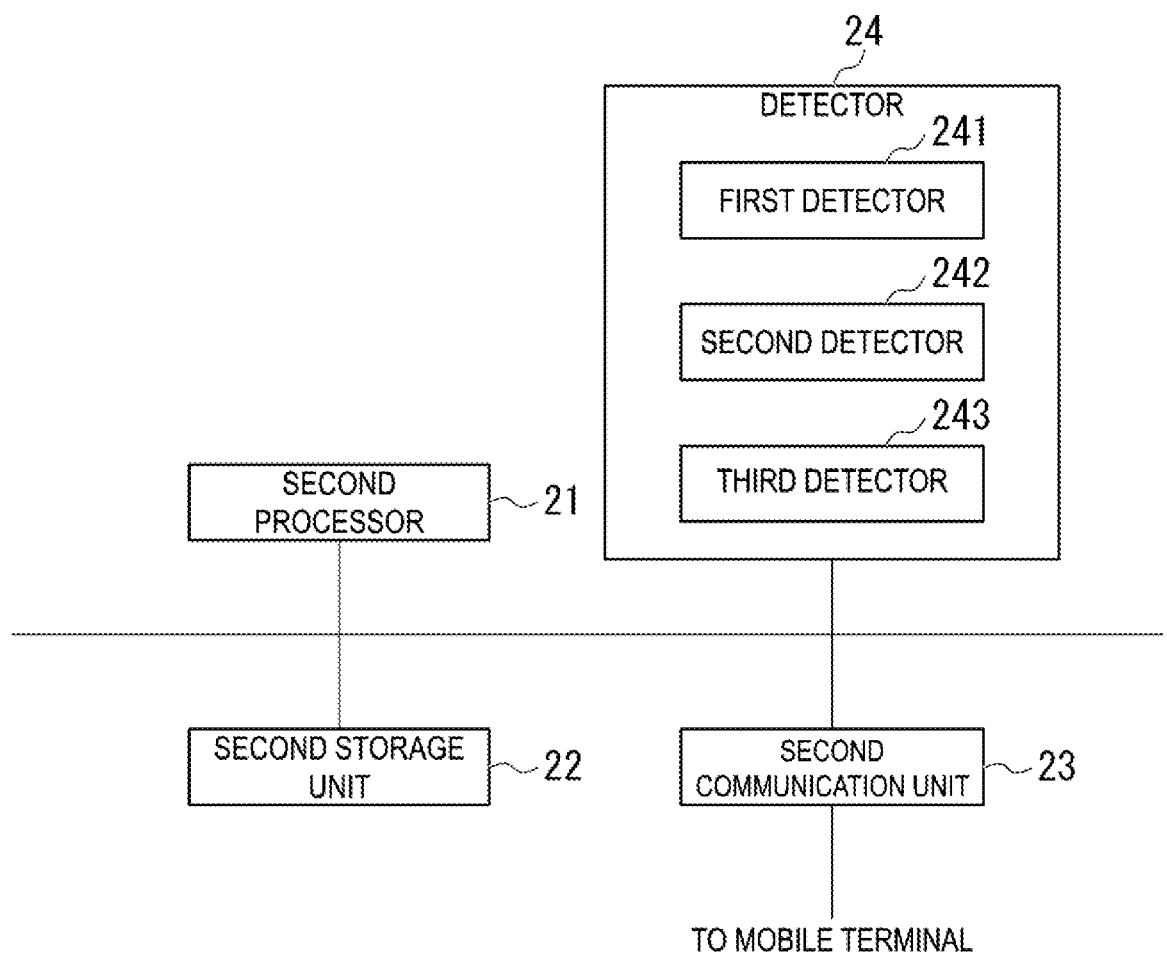
FIG. 3 is a diagram illustrating an example of a hardware configuration of an electronic apparatus 20.

A hardware configuration of the electronic apparatus 20 will be described below with reference to FIG. 3. FIG. 3 is a diagram illustrating an example of a hardware configuration of the electronic apparatus 20.

The electronic apparatus 20 includes, for example, a second processor 21, a second storage unit 22, a second communication unit 23, and a detector 24. These constituent components are communicatively connected to each other via a bus. The electronic apparatus 20 also communicates with the mobile terminal 30 via the second communication unit 23.

The second processor 21 is, for example, a CPU. Further, the second processor 21 may be another processor such as an FPGA, instead of a CPU. The second processor 21 executes various programs stored in the second storage unit 22.

The second storage unit 22 is a storage device including, for example, an SSD, an EEPROM, a ROM, a RAM, or the like. Further, the second storage unit 22 may be an externally mounted storage device coupled by a digital input/output port such as a USB, instead of those built into the electronic apparatus 20. The second storage unit 22 stores various types of information and various programs to be processed by the electronic apparatus 20.

The second communication unit 23 is, for example, a communication device including an antenna for wireless communication or the like.

The detector 24 includes a first detector 241, a second detector 242, and a third detector 243.

The first detector 241 is a sensor configured to detect a speed amount. In the following, a case in which the first detector 241 is an acceleration sensor that detects acceleration as a speed amount will be described as an example. Further, the first detector 241 may be a sensor that detects other amounts as a speed amount.

The second detector 242 is a sensor configured to detect an inclination amount. In the following, a case in which the second detector 242 is a gyro sensor that detects angular velocity as an inclination amount will be described as an example. Further, the second detector 242 may be a sensor that detects other amounts as an inclination amount.

The third detector 243 is a sensor configured to detect a position of the electronic apparatus 20. In the following, a case in which the third detector 243 is a receiving device that receives position information measured by a Global Navigation Satellite System (GNSS) as information indicating the position of the electronic apparatus 20 will be described as an example. In this case, the third detector 243 is, for example, a Global Positioning System (GPS) receiver. Further, the position information is associated with third time information indicating the time at which the position information is measured. By including the third detector 243, the electronic apparatus 20 can acquire position information indicating the current position of the electronic apparatus 20 itself from the GNSS such as a GPS as information indicating the position of the user U. Further, the electronic apparatus 20 may be configured not to include the third detector 243. In this case, the third detector 243 may be configured to be included in the information processing device 10, or may not be included in the information processing device 10.

Hardware Configuration of Mobile Terminal

Figure 4:
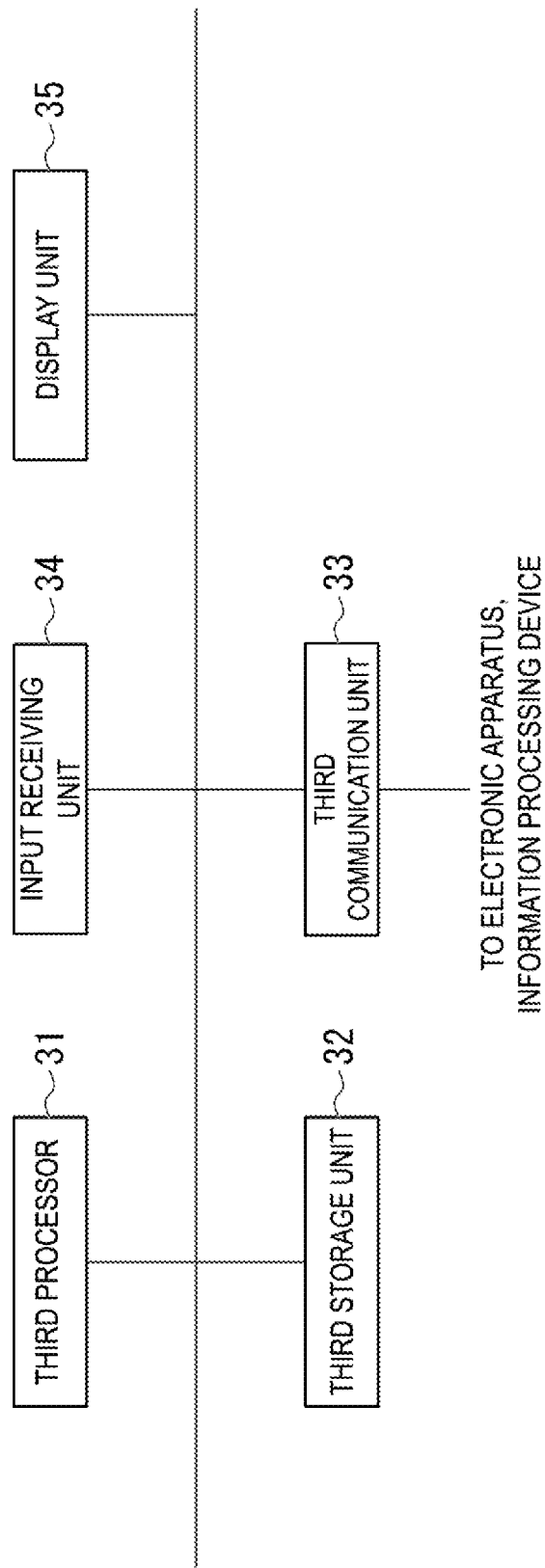
FIG. 4 is a diagram illustrating an example of a hardware configuration of a mobile terminal 30.

A hardware configuration of the mobile terminal 30 will be described below with reference to FIG. 4. FIG. 4 is a diagram illustrating an example of a hardware configuration of the mobile terminal 30.

The mobile terminal 30 includes, for example, a third processor 31, a third storage unit 32, a third communication unit 33, an input receiving unit 34, and a display unit 35. These constituent components are communicatively connected to each other via a bus. The mobile terminal 30 also communicates with each of the information processing device 10 and the electronic apparatus 20 via the third communication unit 33.

The third processor 31 is, for example, a CPU. Further, the third processor 31 may be another processor such as an FPGA, instead of a CPU. The third processor 31 executes various programs stored in the third storage unit 32.

The third storage unit 32 is a storage device including, for example, an SSD, an EEPROM, a ROM, a RAM, or the like. Further, the third storage unit 32 may be an externally mounted storage device coupled by a digital input/output port such as a USB, instead of those built into the mobile terminal 30. The third storage unit 32 stores various types of information, various images, and various programs to be processed by the mobile terminal 30.

The third communication unit 33 is, for example, a communication device including an antenna for wireless communication or the like.

The input receiving unit 34 is, for example, an input device including a hard key, a touch pad, or the like. The input receiving unit 34 may be configured to be integrated with the display unit 35 as a touch panel.

The display unit 35 is, for example, a display device including a display.

Figure 5:
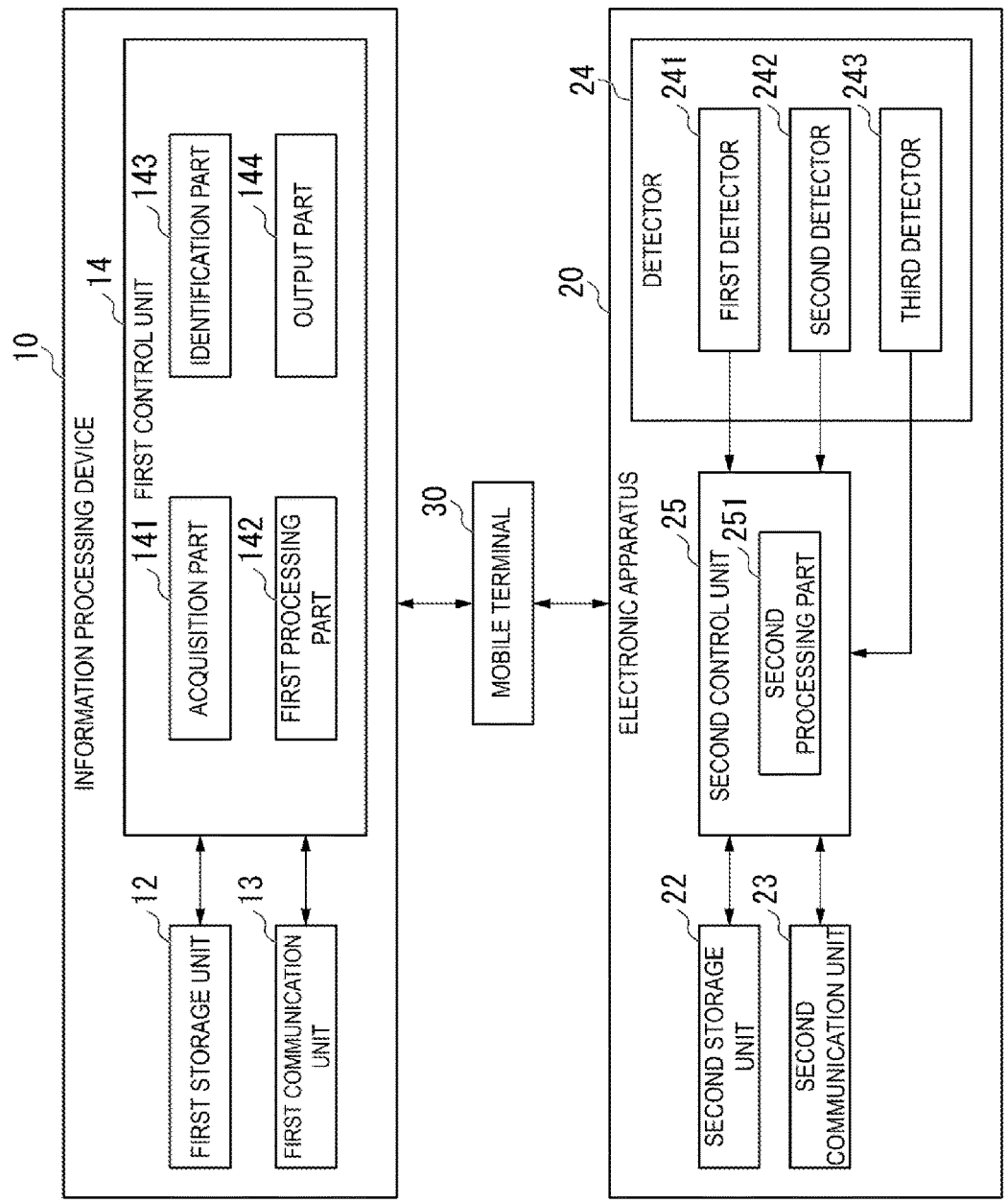
FIG. 5 is a diagram illustrating an example of functional configurations of the information processing device 10 and the electronic apparatus 20.

Functional Configurations of Information Processing Device and Electronic Apparatus Functional configurations of each of the information processing device 10 and the electronic apparatus 20 will be described below with reference to FIG. 5. FIG. 5 is a diagram illustrating an example of functional configurations of each of the information processing device 10 and the electronic apparatus 20.

The information processing device 10 includes, for example, the first storage unit 12, the first communication unit 13, and a first control unit 14.

The first control unit 14 is configured to control the entire information processing device 10. The first control unit 14 includes, for example, an acquisition part 141, a first processing part 142, an identification part 143, and an output part 144. These functional parts included in the first control unit 14 are implemented, for example, when the first processor 11 executes various programs stored in the first storage unit 12. In addition, some or all of the functional parts may be hardware functional units such as large-scale integration (LSI), an application specific integrated circuit (ASIC), and the like. Further, the first control unit 14 may be configured to include other functional parts in addition to the acquisition part 141, the first processing part 142, the identification part 143, and the output part 144.

The acquisition part 141 acquires various types of information received by the information processing device 10 from the electronic apparatus 20.

The first processing part 142 performs various processing operations depending on the operations received from the user.

The identification part 143 identifies a target exercise type based on at least some of various types of information acquired by the acquisition part 141. In addition, the identification part 143 identifies applicable shoes based on the identified target exercise type.

The output part 144 outputs the applicable shoe information about the applicable shoes identified by the identification part 143 to the mobile terminal 30 via the first communication unit 13. Thus, the output part 144 can display the applicable shoe information on the display of the mobile terminal 30. Further, the output part 144 may be configured to output the applicable shoe information from a speaker of the mobile terminal 30, or may be configured to output the applicable shoe information to the user through the mobile terminal 30 using another method.

The electronic apparatus 20 includes, for example, the second storage unit 22, the second communication unit 23, the detector 24, and a second control unit 25.

The second control unit 25 controls the entire electronic apparatus 20. The second control unit 25 includes, for example, a second processing part 251. The functional part included in the second control unit 25 is implemented, for example, when the second processor 21 executes various programs stored in the second storage unit 22. Furthermore, some or all of the functional part may be a hardware functional part such as an LSI or an ASIC. Further, the second control unit 25 may be configured to include other functional parts in addition to the second processing part 251.

The second processing part 251 performs various processing operations in accordance with requests received from the mobile terminal 30.

Information Stored in Information Processing Device

Figure 6:
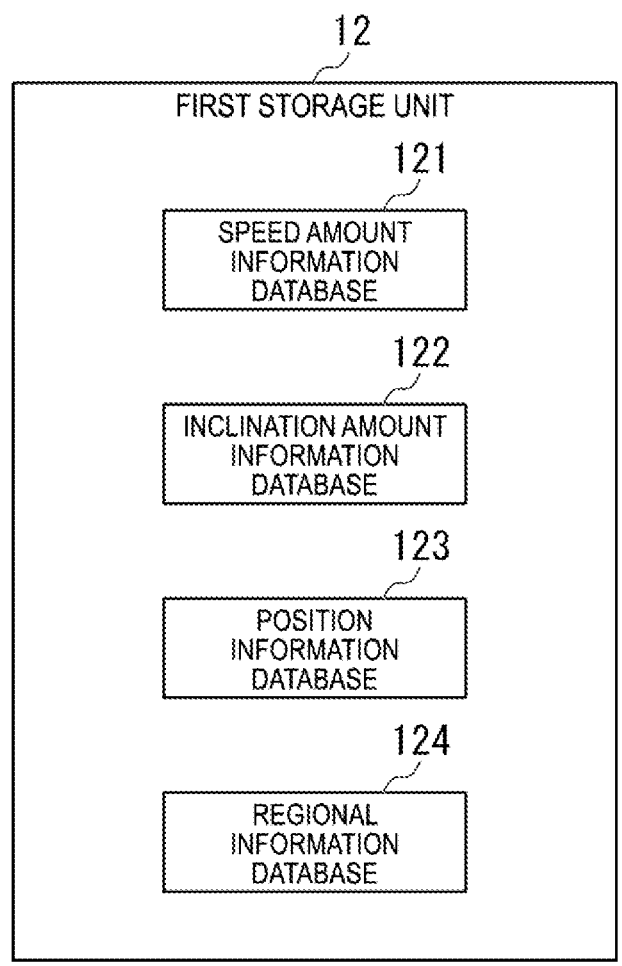
FIG. 6 is a diagram illustrating an example of information stored in the information processing device 10.

Information stored in the information processing device 10 will be described below with reference to FIG. 6. FIG. 6 is a diagram illustrating an example of information stored in the information processing device 10.

In the example illustrated in FIG. 6, the first storage unit 12 of the information processing device 10 stores at least a speed amount information database 121, an inclination amount information database 122, a position information database 123, and a regional information database 124.

The speed amount information database 121 is a database in which speed amount information is stored in chronological order.

The inclination amount information database 122 is a database in which inclination amount information is stored in chronological order.

The position information database 123 is a database in which position information is stored in chronological order. The regional information database 124 is information in which, for each of a plurality of predetermined regions in a national territory in which the information processing system 1 is being used, the regions are associated with positions in the region on the national territory. The identification part 143 of the information processing device 10 can identify, for example, whether the position indicated by certain position information is a position included in any region of the plurality of regions by using the regional information database 124. In the following, a case in which Japan is the nation in which the information processing system 1 is being used will be described as an example. Further, the plurality of regions may be administrative districts in Japan, may be regions defined by the management company that manages the information processing system 1 by dividing the national territory of Japan according to predetermined rules, or may be regions defined by dividing the national territory using another method.

Further, other information is also stored in the first storage unit 12 in addition to the speed amount information database 121, the inclination amount information database 122, the position information database 123, and the regional information database 124. The four databases illustrated in FIG. 6 are only part of the information stored in the first storage unit 12.

Figure 7:
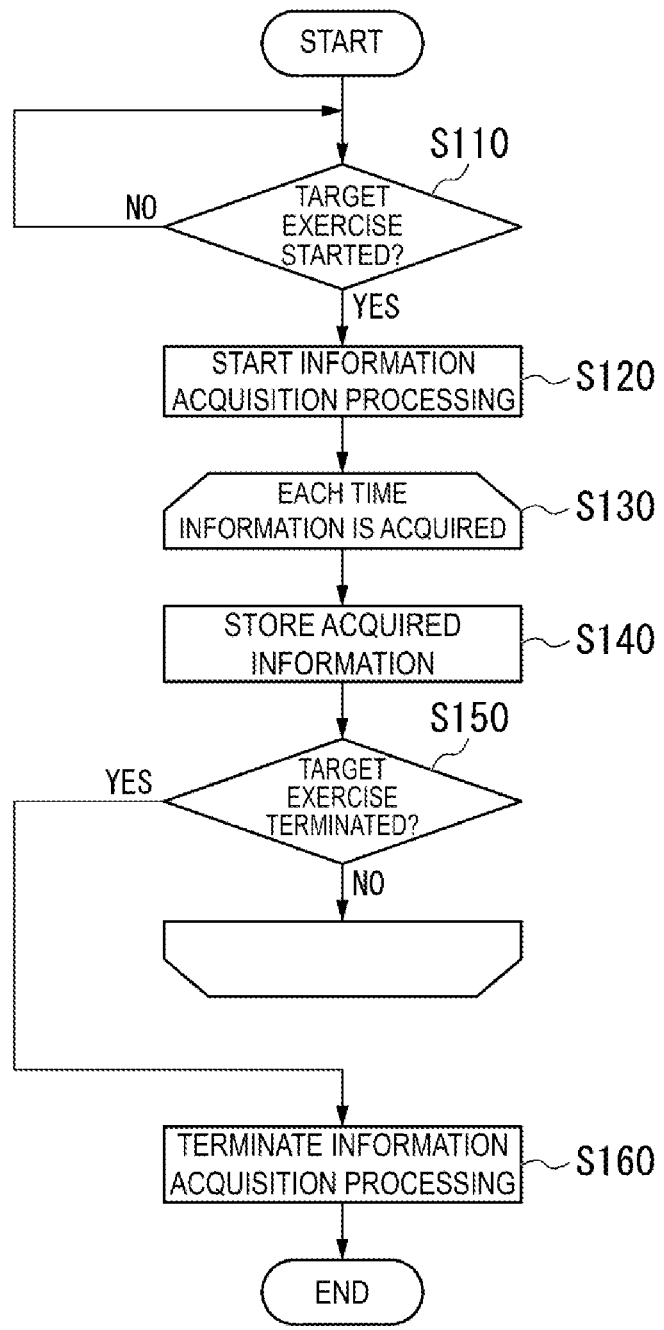
FIG. 7 is a diagram illustrating an example of the flow of processing of the information processing device 10 to store detection amount information.

Processing of Information Processing Device to Store Detection Amount Information Processing of the information processing device 10 to store the detection amount information will be described below with reference to FIG. 7. FIG. 7 is a flowchart showing an example of the flow of processing of the information processing device 10 to store detection amount information.

The acquisition part 141 stands by until the user U starts a target exercise (step S110). Here, if the above-described information reception start condition is satisfied, for example, the acquisition part 141 determines that the user U has started the target exercise. On the other hand, for example, when the information reception start condition is not satisfied, the first processing part 142 determines that the user U has not started the target exercise. For example, when the user U starts the target exercise, the user U performs an operation on the mobile terminal 30 to start the target exercise. The mobile terminal 30 receives the operation to transmit the target exercise start information to the information processing device 10. Further, the acquisition part 141 may be configured to determine whether the user U has started the target exercise using another method.

If it is determined that the user U has started the target exercise (step S110—YES), the acquisition part 141 starts information acquisition processing (step S120). Here, the information acquisition processing is processing in which the acquisition part 141 acquires the detection amount information from the electronic apparatus 20 each time a predetermined sampling period elapses. Here, a case in which the information acquisition processing is processing of the acquisition part 141 to acquire the detection amount information along with position information from the electronic apparatus 20 each time the predetermined sampling period elapses will be described as an example. Although the predetermined sampling period is, for example, about several seconds, it is not limited to thereto.

Next, the first processing part 142 repeats the processing of step S140 and step S150 (step S130) each time the acquisition part 141 acquires the combination of the detection amount information and the position information in the information acquisition processing started in step S120. Further, in FIG. 7, the processing of step S130 is indicated by "each time the information is acquired".

If it is determined that the combination of the detection amount information and the position information has been acquired in step S130, the first processing part 142 causes the first storage unit 12 to store the acquired combination (step S140). More specifically, in this case, the first processing part 142 stores the speed amount information included in the combination in the speed amount information database 121 in chronological order, stores the inclination amount information included in the combination in the inclination amount information database 122 in chronological order, and stores the position information included in the combination in the position information database 123 in chronological order.

Next, the acquisition part 141 determines whether the user U has completed the target exercise (step S150). Here, if the above-described information reception completion condition is satisfied, for example, the acquisition part 141 determines that the user U has completed the target exercise. On the other hand, for example, if the information reception completion condition is not satisfied, the first processing part 142 determines that the user U has not completed the target exercise. For example, when the user U completes the target exercise, the user U performs an operation on the mobile terminal 30 to complete the target exercise. The mobile terminal 30 receives the operation to transmit the target exercise completion information to the information processing device 10. Further, the acquisition part 141 may be configured to determine whether the user U has completed the target exercise using another method.

If it is determined that the user U has not completed the target exercise (step S150-NO), the acquisition part 141 proceeds to step S130 and stands by until the next combination of detection amount information and position information is acquired from the electronic apparatus 20.

On the other hand, if it is determined that the user U has completed the target exercise (step S150—YES), the acquisition part 141 ends the information acquisition processing started in step S120 (step S160), and the processing of the flowchart shown in FIG. 7 is ended.

Through the processing described above, the information processing device 10 acquires various types of information to be used for identifying the type of the target exercise from the electronic apparatus 20 via the mobile terminal 30.

Figure 8:
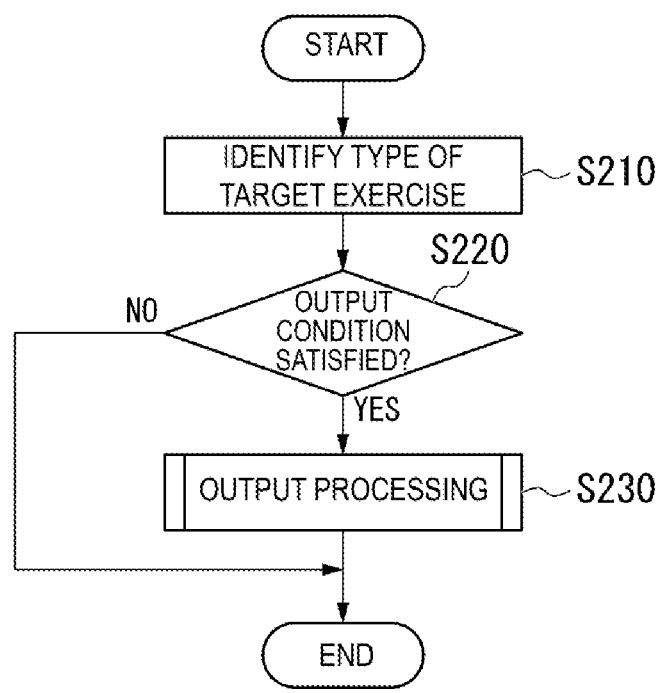
FIG. 8 is a diagram illustrating an example of the flow of processing of the information processing device 10 to output applicable shoe information.

Processing of Information Processing Device to Output applicable shoe Information Processing of the information processing device 10 to output applicable shoe information will be described below with reference to FIG. 8. FIG. 8 is a flowchart showing an example of the flow of processing of the information processing device 10 to output applicable shoe information. For example, the information processing device 10 repeats the processing of the flowchart shown in FIG. 8 each time the speed amount information, the inclination amount information, and the position information are each stored in the first storage unit 12 in Step S140 shown in FIG. 7.

The identification part 143 identifies the type of the target exercise based on the speed amount information database 121 and the inclination amount information database 122 stored in the first storage unit 12 after each of the speed amount information, the inclination amount information, and the position information is stored in the first storage unit 12 in step S140 shown in FIG. 7 (step S210). More specifically, in step S210, the identification part 143 reads all of the speed amount information stored in the speed amount information database 121 from the first storage unit 12, and calculates, as a total exercise time, the sum of the times in which the user U performed the target exercise based on the first time information associated with each piece of the read speed amount information. The identification part 143 calculates the average speed for the period in which the user U performed the target exercise based on the calculated total exercise time and the read speed amount information. In this example, the amount indicated by the speed amount information is acceleration. Thus, the identification part 143 calculates the average speed for the period based on the calculated total exercise time, the acceleration indicated by each piece of the read speed information, and the first time information associated with each piece of the read speed amount information in step S210. The method for calculating the average speed based on the total exercise time, the acceleration, and the first time information may be a known method, or may be a method developed therefrom. In addition, in step S210, the identification part 143 reads all of the inclination amount information stored in the inclination amount information database 122 from the first storage unit 12, and calculates, as an average inclination, the average of the inclination of the road surfaces on which the user U moved for the period based on the read inclination amount information and the calculated total exercise time. In this example, the amount indicated by the inclination amount information is acceleration. Thus, the identification part 143 calculates the average inclination for the period based on the calculated total exercise time, the acceleration indicated by each piece of the read inclination information, and the second time information associated with each piece of the read inclination amount information in step S210. The method for calculating the average inclination based on the calculated total exercise time, the acceleration indicated by each piece of the read inclination amount information, and the second time information associated with each piece of the read inclination amount information may be a known method such as a method based on a slope difference per unit time, or may be a method developed therefrom. The identification part 143 identifies which the target exercise type is among the target exercise type candidates based on the average speed and average inclination calculated described above. Further, the identification part 143 may be configured to identify the target exercise type based on any one of the average speed and the average inclination. Furthermore, the identification part 143 may be configured to identify the target exercise type based on any one of the average speed and the average inclination and the position information. In this case, the information processing device 10 identifies the place at which the user U is performing the target exercise based on the position information for the period, and identifies the target exercise type based on the identified place, the average speed, and the average inclination. Although the place may be, for example, a playground, an urban area, a mountainous area, or the like, it is not limited to these.

Next, the output part 144 determines whether the above-described output condition is satisfied (step S220).

Here, the output condition will be described. The output condition includes one or more conditions. If only one condition is included in the output condition, the identification part 143 determines that the output condition is satisfied when the one condition is satisfied. In addition, if two or more conditions are included in the output condition, the identification part 143 determines that the output condition is satisfied when at least one of the two or more conditions is satisfied.

The following conditions No. 1 to No. 8 can be exemplified as conditions included in the output condition.

No. 1: The total movement distance of the user U using the in-use shoes S should be equal to or greater than a predetermined first threshold.

No. 2: The total exercise time of the user U using the in-use shoes S should be equal to or greater than a predetermined second threshold.

No. 3: A repulsive force of the in-use shoes S should be smaller than a predetermined third threshold.

No. 4: The current season should be the season associated with the type of the target exercise identified by the identification part 143.

No. 5: The total movement distance of the user U using the in-use shoes S should be equal to or greater than a usable distance for the in-use shoes S.

No. 6: The total exercise time of the user U using the in-use shoes S should be equal to or greater than a usable time for the in-use shoes S.

No. 7: The user U should have completed the exercise.

No. 8: The information processing device 10 should have received information indicating that a problem occurred in the in-use shoes S.

In the following, a case in which all of the above-described conditions No. 1 to No. 8 are included in the output condition will be described as an example. Further, the output condition may be configured to include some of the above-described conditions No. 1 to No. 8. Furthermore, instead of some or all of the conditions No. 1 to No. 8 described above, or in addition to all of the conditions No. 1 to No. 8 described above, the output condition may be configured to include other conditions that trigger an output of the applicable shoe information, for example, conditions that the number of days in which the user U performs exercise should be equal to or greater than a predetermined number of days, the movement distance per day is 10 km or more, and the like. In addition, the condition No. 5 may be that the total movement distance of the user U using the in-use shoes S should be equal to or greater than a predetermined percentage of the usable distance of the in-use shoes S. Although the predetermined percentage may be, for example, 80%, a percentage lower than 80%, or a percentage higher than 80%. In addition, the condition No. 6 may be that the total exercise time of the user U using the in-use shoes S should be equal to or greater than a predetermined percentage of the usable time of the in-use shoes S.

Here, although the first threshold may be, for example, 700 km, it may be a distance shorter than 700 km or a distance longer than 700 km. Although the second threshold is 100 hours, it may be a time shorter than 100 hours, or a time longer than 100 hours. Since the third threshold is a value determined in accordance with the structure, material, and the like of the in-use shoes S, the value is not exemplified. The season associated with the type of the target exercise is, for example, spring or time near the end of winter if the type of the target exercise is running. This is because statistics show that running is most actively performed in spring or time near the end of winter. In addition, the season associated with the type of the target exercise is, for example, spring or time near the end of winter if the type of the target exercise is walking.

This is because statistics show that running is most actively performed in spring or time near the end of winter. In addition, the season associated with the type of the target exercise is, for example, autumn or time near the end of summer if the type of the target exercise is mountain climbing. This is because statistics show that mountain climbing is most actively performed in autumn or time near the end of summer. The usable distance of the in-use shoes S is an estimated distance over which the in-use shoes S can be used without having a problem. In other words, if the total movement distance of the user U using the in-use shoes S exceeds the usable distance of the in-use shoes S, the in-use shoes S are highly likely to start having a problem. The usable distance of the in-use shoes S may be a distance provided by the manufacturer of the in-use shoes S, or may be a distance calculated based on the statistical data related to use of the in-use shoes S. Information indicating the usable distance of the in-use shoes S is stored in, for example, the information processing device 10, other servers that are communicatively connected to the information processing device 10, or the like. The usable time of the in-use shoes S is an estimated time during which the in-use shoes S can be used without having a problem, and is, for example, a service life. In other words, if the total exercise time of the user U using the in-use shoes S exceeds the usable time of the in-use shoes S, the in-use shoes S are highly likely to start having a problem. The usable time of the in-use shoes S may be a time provided by the manufacturer of the in-use shoes S, or may be a time calculated based on the statistical data related to use of the in-use shoes S. Information indicating the usable time of the in-use shoes S is stored in, for example, the information processing device 10, other servers that are communicatively connected to the information processing device 10, or the like. The information indicating that a problem has occurred in the in-use shoes S is transmitted from the mobile terminal 30. In other words, when a problem has occurred in the in-use shoes S, the user U performs an operation indicating that a problem has occurred in the in-use shoes S on the mobile terminal 30. When the operation is received, the mobile terminal 30 transmits the information indicating that a problem has occurred in the in-use shoes S to the information processing device 10. The problem that may occur in the in-use shoes S is, for example, tearing of a surface of the in-use shoes S, tearing of the sole of the in-use shoes S, or the like, and is not limited thereto.

For example, the identification part 143 calculates the total movement distance of the user U based on the position information database 123 stored in the first storage unit 12 in step S220. In this way, the identification part 143 determines whether the conditions No. 1 and No. 5 described above are satisfied. Further, the identification part 143 acquires the information indicating the usable distance from the first storage unit 12 or other servers that are communicatively connected to the information processing device 10. In addition, for example, the identification part 143 calculates the total exercise time of the user U based on at least one of the speed amount information database 121, the inclination amount information database 122, and the position information database 123 stored in the first storage unit 12 in step S220. In this way, the identification part 143 determines whether the conditions No. 2 and No. 6 described above are satisfied. Further, the identification part 143 acquires the information indicating the usable time from the first storage unit 12 or other servers that are communicatively connected to the information processing device 10. In addition, for example, the identification part 143 calculates the current repulsive force of the in-use shoes S based on the speed amount information database 121 stored in the first storage unit 12 in step S220. In this way, the identification part 143 determines whether the condition No. 3 described above is satisfied. Further, the method of calculating the repulsive force of the in-use shoes S based on the speed amount may be a known method, or may be a method developed therefrom. In addition, for example, the identification part 143 identifies the current date and time and identifies the current season from the identified date and time in step S220. In this way, the identification part 143 determines whether the condition No. 4 described above is satisfied. Further, the method of identifying the season from the date and time may be a known method, or may be a method developed therefrom. In addition, for example, the identification part 143 identifies in step S220 whether the processing of step S160 has been performed. In this way, the identification part 143 determines whether the condition No. 7 described above is satisfied. Furthermore, for example, the identification part 143 identifies, in step S220, whether the information processing device 10 has received the information indicating that a problem had occurred in the in-use shoes S from the mobile terminal 30. In this way, the identification part 143 determines whether the condition No. 8 described above is satisfied.

If it is determined that the output condition is not satisfied (step S220-NO), the identification part 143 terminates the processing of the flowchart shown in FIG. 8.

On the other hand, if it is determined that the output condition is satisfied (step S220—YES), the identification part 143 performs the output processing (step S230), and then terminates the processing of the flowchart shown in FIG. 8.

Figure 9:
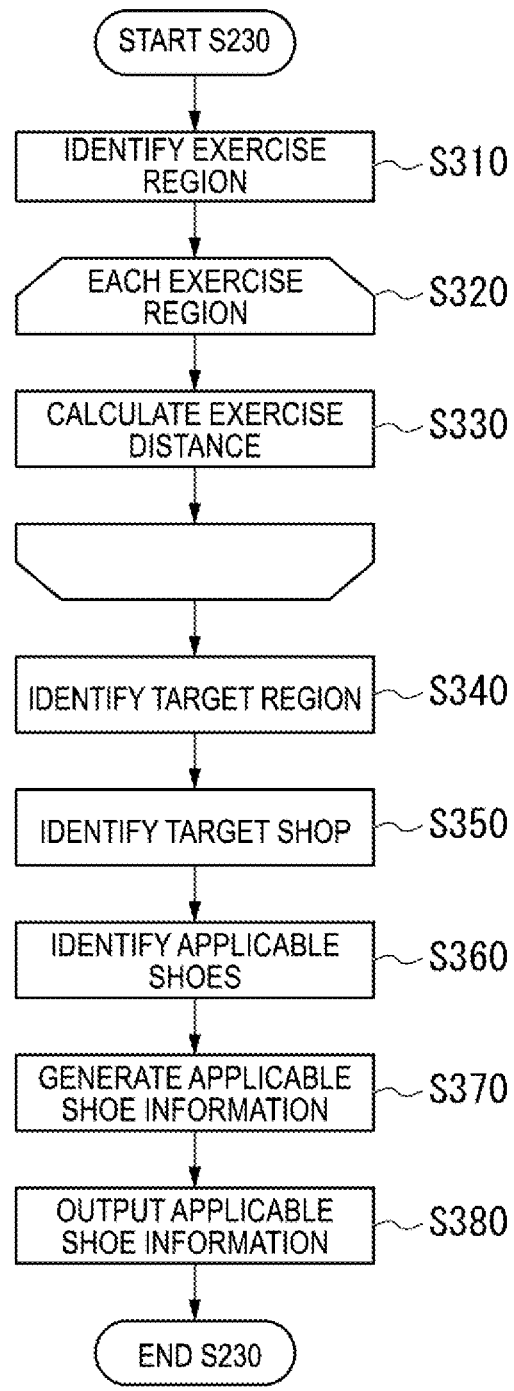
FIG. 9 is a diagram illustrating an example of the flow of output processing of step S230 illustrated in FIG. 8.

Here, the output processing of step S230 will be described with reference to FIG. 9. FIG. 9 is a diagram illustrating an example of the flow of the output processing of step S230 shown in FIG. 8.

If it is determined that the output condition is satisfied in step S220 shown in FIG. 8, the identification part 143 identifies each of the one or more regions in which the user U performs exercise as an exercise region (step S310). More specifically, the identification part 143 identifies one or more exercise regions based on the position information database 123 and the regional information database 124 stored in the first storage unit 12 in step S310.

Next, the identification part 143 selects each of the one or more exercise regions identified in step S310 as a target exercise region, and performs the processing of step S330 for each selected target exercise region (step S320). Further, the identification part 143 may perform the processes of steps S320 and S330 in parallel.

The identification part 143 calculates the distance over which the user U moved in the target exercise region selected in step S320 based on the position information database 123 and the regional information database 124 stored in the first storage unit 12 as an exercise distance (step S330).

After the processing of step S330 is performed, the identification part 143 transitions to step S320 to select the next target exercise region from among the unselected exercise regions. Further, if there is no unselected exercise region in step S320, the identification part 143 terminates the repetition of the processes of step S320 and step S330, and transitions to step S340.

After the processes of steps S320 to S330 are repeated, the identification part 143 identifies the exercise region corresponding to the longest exercise distance among the one or more exercise regions identified in step S310 as a target region (step S340).

Next, the identification part 143 identifies, as a target shop, each of one or more shops that sell shoes among the shops located in the target region identified in step S340 (step S350). Here, the identification part 143 acquires map information from the other servers that are communicatively connected to the information processing device 10 in step S350, for example, and identifies the target shop based on the acquired map information and the target region identified in step S340. Further, the identification part 143 may be configured to identify one of the one or more shops as a target shop according to predetermined rules. The predetermined rules may be, for example, that the shop should have the largest size, the shop should handle the largest amount of shoes of the manufacturer providing that kind of in-use shoes S, the shop should be located closest to the current position of the user U, the shop should be located closes to the home of the user U, and the like, and they are not limited thereto. In addition, if there is not any of shop that sells such shoes within the target region, the identification part 143 may be configured to identify, as a target shop, each of the one or more shops selling such shoes among the shops located in a region adjacent to the target region. Further, the identification part 143 may be configured to identify, as a target shop, one or more shops having a partnership with the company providing the information processing system 1 among the one or more shops selling such shoes among the shops located in the target region identified in step S340.

Next, the identification part 143 identifies the shoes corresponding to the type of the target exercise identified in step S210 shown in FIG. 8 as applicable shoes (step S360). Information indicating the correspondence relationship between the type of the target exercise and the applicable shoes may be configured to be, for example, stored as information in a predetermined format such as a table format in the first storage unit 12, or may be configured to be acquired by the information processing device 10 from other servers communicatively connected to the information processing device 10. In step S360, the identification part 143 identifies the applicable shoes based on the type of the target exercise identified in step S210 and the above information. For example, the identification part 143 identifies the shoes corresponding to running as applicable shoes if the type of the target exercise is running. In addition, for example, the identification part 143 identifies the shoes corresponding to walking as applicable shoes if the type of the target exercise is walking.

Furthermore, for example, if the type of the target exercise is trail running, the identification part 143 identifies shoes corresponding to trail running as applicable shoes.

Furthermore, for example, if the type of the target exercise is mountain climbing, the identification part 143 identifies shoes applicable to mountain climbing as applicable shoes.

Furthermore, some or all of shoes applicable to each of running, walking, trail running, and mountain climbing may be of different types, or may be of the same type. Here, in the present embodiment, types of shoes are classified depending on a combination of some or all of the type of shoes, application of shoes, manufacturer of shoes, model of shoes, and the like. Further, the first processing part 142 of the information processing device 10 performs addition, change, deletion, and the like of information indicating the correspondence relationship between the type of the target exercise and the applicable shoes in response to a request from another information processing device that is communicatively connected to the information processing device 10. For this reason, the applicable shoes with respect to a certain type of the target exercise may not be the same at all times, and may be updated to new shoes.

Further, the identification part 143 may be configured to identify the applicable shoes as follows in step S360 when identifying, as applicable shoes, the shoes corresponding to the type of the target exercise identified in step S210 shown in FIG. 8. For example, if the type of the target exercise is running and the user is determined to perform long slow distance (LSD) running on weekends and perform pace running on weekdays based on the speed amount information database 121, the inclination amount information database 122, and the position information database 123 stored in the first storage unit 12, the identification part 143 identifies shoes suitable for use of both LSD running and pace running among shoes corresponding to running as applicable shoes for running. In addition, for example, if the type of the target exercise is running and it has been identified that the movement distance per month and the exercise time per month are great based on the speed amount information database 121, the inclination amount information database 122, and the position information database 123 stored in the first storage unit 12, the identification part 143 determines the amount and frequency of training to be great, and identifies shoes suitable for use of training among shoes corresponding to running as applicable shoes for running. In addition, for example, if the type of the target exercise is running and it has been identified that the movement distance per month and the exercise time per month are small based on the speed amount information database 121, the inclination amount information database 122, and the position information database 123 stored in the first storage unit 12, the identification part 143 determines the amount and frequency of training to be small, and identifies shoes suitable for beginners among shoes corresponding to running as applicable shoes for running. In addition, for example, if the type of the target exercise is running and it has been identified that the target region is a forest, a mountainous area, or the like based on the speed amount information database 121, the inclination amount information database 122, and the position information database 123 stored in the first storage unit 12, the identification part 143 identifies shoes for trail running as applicable shoes for running. In addition, for example, if the type of the target exercise is running and it has been identified that the movement speed becomes slower as time passes based on the speed amount information database 121, the inclination amount information database 122, and the position information database 123 stored in the first storage unit 12, the identification part 143 identifies shoes that are easy to carry and light on the feet as applicable shoes for running. Further, when information indicating the heart rate, or the like of the user U is transmitted from the mobile terminal 30 to the information processing device 10, the identification part 143 may be configured to identify such applicable shoes based on the heart rate or the like of the user U. Even when the type of the target exercise is a target exercise type candidate other than running, the identification part 143 may identify such applicable shoes using the method as above. In addition, the matters described in this paragraph may be used as the output condition described above.

Next, the output part 144 generates, as applicable shoe information, information about the applicable shoes identified by the identification part 143 in step S360 (step S370). In this example, the applicable shoe information is information indicating a coupon for discount on the sales price of the applicable shoes as described above. In other words, in step S370, the output part 144 generates information indicating a coupon for discount on the sales price of the applicable shoes identified by the identification part 143 in step S360. At this moment, the output part 144 determines a discount rate for the sales price of the applicable shoes, and generates information indicating a coupon for the determined discount rate as the applicable shoe information indicating the coupon for discount on the sales price of the applicable shoes.

The discount rate determined by the output part 144 may be, for example, the same predetermined discount rate regardless of the type of shoes identified as applicable shoes. Although the predetermined discount rate is, for example, 30%, it may be a discount rate lower than 30%, or a discount rate higher than 30%.

Furthermore, the discount rate determined by the output part 144 may differ depending on each type of target exercise, for example. In this case, for example, the discount rate of the coupon indicated by the applicable shoe information about the applicable shoes corresponding to trail running is higher than a discount rate of a coupon indicated by applicable shoe information about applicable shoes corresponding to mountain climbing because the price of applicable shoes corresponding to trail running is mostly higher than that of applicable shoes corresponding to mountain climbing. In addition, in this case, for example, the discount rate of the coupon indicated by the applicable shoe information about the applicable shoes corresponding to mountain climbing is higher than a discount rate of a coupon indicated by applicable shoe information about applicable shoes corresponding to running because the price of applicable shoes corresponding to mountain climbing is mostly higher than that of applicable shoes corresponding to running. In addition, in this case, for example, the discount rate of the coupon indicated by the applicable shoe information about the applicable shoes corresponding to running is higher than a discount rate of a coupon indicated by applicable shoe information about applicable shoes corresponding to walking because the price of applicable shoes corresponding to running is mostly higher than that of applicable shoes corresponding to walking. In this way, the discount rate determined by the output part 144 can differ depending on each type of target exercise.

Furthermore, the discount rate determined by the output part 144 may differ depending on each shop identified as a target shop, for example.

Furthermore, the discount rate determined by the output part 144 may differ depending on each region identified as a target region, for example.

Furthermore, the discount rate determined by the output part 144 may become higher as the total movement distance of the user U using the in-use shoes S becomes longer, and may become higher as the total movement distance of the user U using the in-use shoe S becomes shorter.

Furthermore, the discount rate determined by the output part 144 may become higher as the total exercise time of the user U using the in-use shoes S becomes longer, and may become higher as the total exercise time of the user U using the in-use shoe S becomes shorter.

Furthermore, the discount rate determined by the output part 144 may become higher as the number of times of exercise of the user U using the in-use shoes S becomes greater, and may become higher as the number of times of exercise of the user U using the in-use shoe S becomes smaller.

Furthermore, the coupon indicated by the applicable shoe information about the applicable shoes may include information indicating that the discount rate becomes lower as the time that elapsed after the information indicating the coupon was displayed on the mobile terminal 30 becomes longer. In this case, the discount rate becomes higher as the elapsed time becomes shorter. As a result, when the information indicating the coupon is displayed on the mobile terminal 30, the user U is highly likely to be able to replace the shoes as soon as possible. That is, in this manner, the information processing system 1 can provide incentives to get the user U to replace the shoes earlier. For example, in this case, the discount rate would be 30% within one week after the information indicating the coupon was displayed on the mobile terminal 30, and 15% if one week has passed after the information indicating the coupon was displayed on the mobile terminal 30.

Furthermore, the coupon indicated by the applicable shoe information about the applicable shoes may include information indicating the usable period of time. In this case also, when the information indicating the coupon is displayed on the mobile terminal 30, the user U is highly likely to be able to replace the shoes as soon as possible. That is, in this manner, the information processing system 1 can provide incentives to get the user U to replace the shoes earlier. For example, although the usable period of time may be one week after the information indicating the coupon is displayed on the mobile terminal 30 in this case, it may be a period shorter than one week, or may be a period longer than one week. For example, in such a case, the coupon is invalidated if the information indicating the coupon is not used within one week after it is displayed on the mobile terminal 30.

Here, the first storage unit 12 of the information processing device 10 stores a discount rate table to be referred to when the output part 144 determines a discount rate. In this discount rate table, types of shoes, regions, shops, discount rates, usable periods of time, exercise time, movement distance, number of times of exercise, etc. are stored in association with each other. This discount rate table is edited by the company providing the information processing system 1, the manufacturer providing shoes, and a staff member of the shop selling shoes. In other words, the first processing part 142 of the information processing device 10 performs addition, deletion, and change of the records contained in the discount rate table in response to a request from another information processing device that is communicatively connected to the information processing device 10. Then, the output part 144 determines the discount rate of the coupon indicated by the applicable shoe information about the applicable shoes based on the discount rate table stored in the first storage unit 12, the target region identified by the identification part 143, the target shop, the applicable shoes, and the like. Further, any other method may be used as the method for determining the discount rate of a coupon.

After the processing of step S370 is performed, the output part 144 transmits the applicable shoe information generated in step S370 to the mobile terminal 30 via the first communication unit 13 (step S380), and terminates the processing of the flowchart shown in FIG. 9. In other words, the output part 144 outputs the applicable shoe information to the mobile terminal 30 in step S380. In this way, the mobile terminal 30 causes the received applicable shoe information to be displayed on the display of the mobile terminal 30. As a result, the information processing system 1 can provide information about the shoes suitable for the exercise performed by the user U.

As described above, the information processing device 10 identifies the type of the target exercise based on the detection amount detected by the detector 24 of the electronic apparatus 20, and outputs the applicable shoe information about the applicable shoes corresponding to the identified type of the target exercise. In this way, the information processing device 10 can provide information about the shoes suitable for the exercise performed by the user U. As a result, the information processing device 10 provides a benefit to the exercise status of the user U, and has the effect of repeatedly performing the target exercise. This is also beneficial because it leads to a sustained health condition of the user U. Furthermore, the information processing device 10 can facilitate purchasing of applicable shoes at a specific shop and purchasing of specific shoes as applicable shoes. This is also beneficial because it encourages vitalization of economic activities in the range of life in which the user U lives.

Figure 10:
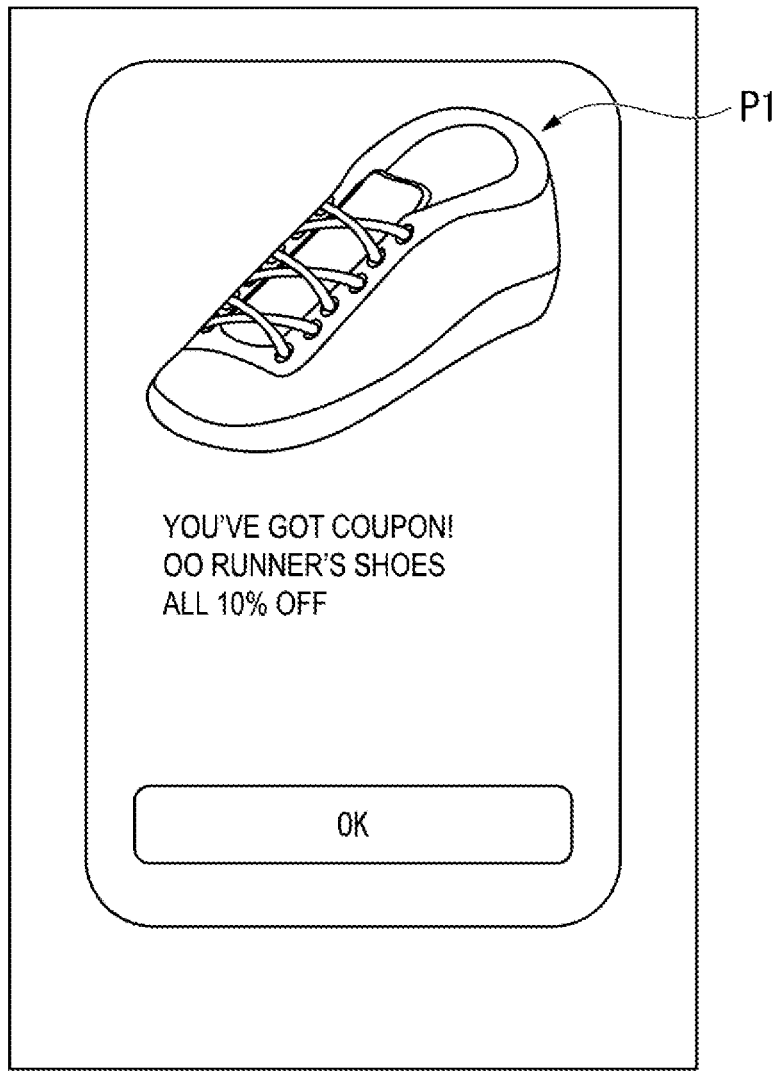
FIG. 10 is a diagram illustrating an example of applicable shoe information displayed on the mobile terminal 30.

FIG. 10 is a diagram illustrating an example of applicable shoe information displayed on the display of the mobile terminal 30. As illustrated in FIG. 10, the applicable shoe information includes an image P1 showing an applicable shoe whose selling price would be discounted with a coupon indicated by the applicable shoe information. In addition, the applicable shoe information includes "You've got the coupon! 10% off all OO runners' shoes" as a sentence P2 including the discount rate provided by the coupon. As a result, the user U can buy shoes suitable for the type of the target exercise while reducing the cost needed for replacing the in-use shoes S with new shoes.

Further, in the example described above, the information processing device 10 has a configuration in which any of the target exercise type candidates is identified as a type of target exercise. However, the information processing device 10 may be configured to identify each of two or more of the target exercise type candidates as types of target exercise. In this case, the information processing device 10 may be configured to output different applicable shoe information for each of the identified two or more types of target exercise. Such a situation may occur when the user U performs different exercise depending on the day of the week. Furthermore, when two or more types of target exercise are identified, the information processing device 10 may be configured to output applicable shoe information for one type of target exercise satisfying a predetermined selection condition among the two or more identified types of target exercise. The predetermined selection condition may be, for example, that the time in which the user U performed exercise should be the longest, that the distance over which the user U moved should be the longest, or that the time in which the user U performed exercise should be the longest and the distance over which the user U moved should be the longest, or other conditions may be included. In these cases, the information processing device 10 identifies one type of target exercise satisfying the predetermined selection condition based on the speed amount information database 121, the inclination amount information database 122, and the position information database 123 stored in the first storage unit 12.

Furthermore, the processing performed by the electronic apparatus 20 described above may instead be performed by the mobile terminal 30. In other words, the mobile terminal 30 may function as the electronic apparatus 20. In this case, detection of the speed amount by the first detector 241 of the electronic apparatus 20 is performed by, for example, the acceleration sensor of the mobile terminal 30. In addition, in this case, detection of the inclination amount by the second detector 242 of the electronic apparatus 20 is performed by, for example, the gyro sensor of the mobile terminal 30. In addition, in this case, detection of position information by the third detector 243 of the electronic apparatus 20 is performed by, for example, the GPS receiver of the mobile terminal 30.

Furthermore, the electronic apparatus 20 described above may be configured to be attached to another exercise tool such as a golf club, for example. When the electronic apparatus 20 is attached to a golf club, the electronic apparatus 20 detects, for example, a speed amount indicating the speed of swing of the golf club, a rotation amount indicating a rotation of the golf club during the swing, and the like as detection amounts. In addition, in this case, the information processing device 10 has a swing of a driver, a swing of an iron, a swing of a putter, and the like as target exercise type candidates and identifies the type of target exercise based on such detection amounts. Then, the information processing device 10 outputs information about golf clubs corresponding to the identified type of target exercise.

Furthermore, the electronic apparatus 20 described above may be configured to be attached to another exercise tool such as sportswear, for example. When the electronic apparatus 20 is attached to sportswear, the electronic apparatus 20 detects, for example, a speed amount indicating the speed of the user U, a vibration amount indicating vibration of the sportswear, and the like as the detection amounts. In addition, in this case, the information processing device 10 has basketball, volleyball, swimming, and the like as target exercise type candidates and identifies the type of target exercise based on such detection amounts. Then, the information processing device 10 outputs information about sportswear corresponding to the identified type of target exercise.

In addition, the information processing device 10 described above has information in which identification information for identifying the in-use shoes S is associated with identification information for identifying the electronic apparatus 20 registered by the user U via the mobile terminal 30 in advance. Thus, in the example described above, the information processing device 10 can acquire various types of information about the in-use shoe S from other servers that are communicatively connected to the information processing device 10, and can associate each piece of information acquired from the electronic apparatus 20 with the in-use shoes S. Each of the method for the information processing device 10 to identify the in-use shoes S in various processes and the method for the information processing device 10 to associate each piece of information acquired from the electronic apparatus 20 with the in-use shoes S may be known methods or methods developed therefrom. Due to the above-described circumstances, description on each of various processes of the information processing device 10 to identify the in-use shoes S and various processes of the information processing device 10 to associate each piece of information acquired from the electronic apparatus 20 with the in-use shoes S will be omitted below in order to simplify the description.

Furthermore, when the detection amount information is transmitted to the information processing device 10, the electronic apparatus 20 described above temporarily stores the detected detection amount information in the second storage unit 22 in chronological order if communication with the information processing device 10 is interrupted for any reason. Such temporary storage of the detection amount information is held for, for example, about 48 hours at maximum. In addition, when communication with the information processing device 10 is restored, the electronic apparatus 20 transmits the detection amount information temporarily stored in the second storage unit 22 to the information processing device 10 in chronological order. Further, when new detection amount information is to be stored in the second storage unit 22 while the detection amount information has been stored in the second storage unit 22 for 48 hours, the electronic apparatus 20 deletes the old detection amount information stored in the second storage unit 22, and causes the second storage unit 22 to store the new detection amount.

As described above, an information processing system according to an embodiment includes an electronic apparatus that includes a detector that detects one or more pieces of data indicating an exercise type of a user, the electronic apparatus being attached to in-use shoes used by the user, and an information processing device that includes an identification part that identifies the exercise type of the user based on the one or more pieces of data detected by the detector and an output part that outputs applicable shoe information about the applicable shoes corresponding to the exercise type identified by the identification part. In this way, the information processing system can provide information about the shoe suitable for the exercise performed by the user. Here, in the example described above, the information processing system 1 is an example of the information processing system. In addition, in the example described above, the user U is an example of the user. In addition, in the example described above, the in-use shoes U are an example of the in-use shoes. In addition, in the example described above, the electronic apparatus 20 are an example of the electronic apparatus. Here, in the example described above, the information processing device 10 is an example of the information processing device. In addition, in the example described above, the detection amount is an example of the one or more pieces of data. In addition, in the example described above, the detector 24 is an example of the detector. In addition, in the example described above, the target exercise is an example of the exercise of the user. In addition, in the example described above, the type of target exercise is an example of the type of the exercise of the user. In addition, in the example described above, the identification part 143 is an example of the identification part. In addition, in the example described above, the output part 144 is an example of the output part.

In addition, the information processing system may employ the configuration in which the detector includes a first detector that detects data indicating a speed of movement as one of the one or more pieces of data. Here, in the example described above, the speed amount is an example of the data indicating a speed of movement. In addition, in the example described above, the first detector 241 is an example of the first detector.

Furthermore, the information processing system may employ the configuration in which the first detector detects acceleration as data indicating a speed.

In addition, the information processing system may employ the configuration in which the detector includes a second detector that detects data indicating an inclination of a road surface as one of the one or more pieces of data. Here, in the example described above, the inclination amount is an example of the data indicating an inclination of a road surface. In addition, in the example described above, the second detector 242 is an example of the second detector.

Furthermore, the information processing system may employ the configuration in which the second detector detects angular velocity as the data indicating an inclination.

Furthermore, the information processing system may employ the configuration in which, if the identification part determines that the exercise type of the user is a first exercise type, the output part may output, as applicable shoe information, first applicable shoe information about a first applicable shoe corresponding to the first exercise type, and if the identification part determines that the exercise type of the user is a second exercise type, the output part outputs, as the applicable shoe information, second applicable shoe information about a second applicable shoe corresponding to the second exercise type.

In addition, the information processing system may employ the configuration in which the first applicable shoe information is information indicating a coupon for discount on a sales price of the first applicable shoe, the second applicable shoe information is information indicating a coupon for discount on a sales price of the second applicable shoe, and a discount amount of the coupon indicated by the second applicable shoe information is different from a discount amount of the coupon indicated by the first applicable shoe information.

In addition, the information processing system may employ the configuration in which the detector includes a third detector that detects position information indicating a position of the electronic apparatus. In addition, in the example described above, the third detector 243 is an example of the third detector.

In addition, the information processing system may employ the configuration in which the identification part identifies the exercise type of the user based on the one or more pieces of data and the position information detected by the detector.

In addition, the information processing system may employ the configuration in which the identification part identifies a region in which the user performed exercise as a target region based on the position information detected by the detector and identifies a shop that sells shoes in the identified target region as a target shop, and the output part outputs applicable shoe information about applicable shoes being sold by the target shop.

In addition, the information processing system may employ the configuration in which the identification part calculates a distance over which the user moved for each of two or more regions in which the user performed exercise based on the position information detected by the detector, identifies the region in which the user moved over the longest distance from among the two or more regions, and identifies a target shop in the identified target region.

In addition, the information processing system may employ the configuration in which the output part calculates a distance over which the user moved based on the position information detected by the detector, and outputs the applicable shoe information if the calculated distance is equal to or greater than a predetermined first threshold. Here, in the example described above, 700 km is an example of the first threshold.

In addition, the information processing system may employ the configuration in which, if the identification part has identified two or more types as the exercise type of the user, the output part outputs pieces of the applicable shoe information which are different for each of two or more types.

In addition, the information processing system may employ the configuration, if the identification part has identified two or more types as the exercise type of the user, the output part outputs applicable shoe information for the type satisfying a predetermined condition among the two or more types. Here, in the example described above, the predetermined selection condition is an example of the predetermined condition.

In addition, the information processing system may employ the configuration in which the predetermined condition is any of conditions that the time in which the user performed exercise should be the longest, that the distance over which the user moved should be the longest, or that the time in which the user performed exercise should be the longest and the distance over which the user moved should be the longest.

In addition, the information processing system may employ the configuration in which the output part outputs applicable shoe information if a predetermined output condition is satisfied.

In addition, the information processing system may employ the configuration in which the predetermined output condition includes a condition that a repulsive force of the in-use shoes has a value smaller than a predetermined second threshold. Here, in the example described above, the third threshold is an example of the second threshold.

In addition, the information processing system may employ the configuration in which the predetermined output condition includes a condition that the current season should be a season associated with the exercise type identified by the identification part.

In addition, the information processing system may employ the configuration in which the predetermined output condition includes a condition that a total movement distance of the user using the in-use shoes should be equal to or greater than a usable distance of the in-use shoes.

In addition, the information processing system may employ the configuration in which the predetermined output condition includes a condition that a total exercise time of the user using the in-use shoes should be equal to or greater than a usable time of the in-use shoes.

In addition, the information processing system may employ the configuration in which the predetermined output condition includes a condition that the user should have completed the exercise.

In addition, the information processing system may employ the configuration in which the predetermined output condition includes a condition that the information processing device should have received information indicating that a problem has occurred in the in-use shoes.

In addition, the information processing system may employ the configuration in which the predetermined output condition includes a condition that the information processing device should have received information indicating that a problem has occurred in the in-use shoes.

Although the embodiments of this disclosure have been described in detail with reference to the drawings, the specific configurations are not limited to this embodiment, and may be modified, substituted, deleted, and the like unless otherwise the spirit of the disclosure is limited.

In addition, a program for realizing the functions of any constituent units of the device described above may be recorded in a computer-readable recording medium, and the program may be read and executed by a computer system. Here, the device is, for example, the information processing device 10, the electronic apparatus 20, the mobile terminal 30, and the like. Further, the "computer system" mentioned here is assumed to include hardware such as an operating system (OS) or a peripheral apparatus. Furthermore, the "computer-readable recording medium" refers to a portable medium such as a flexible disk, a magneto-optical disk, a ROM, a compact disc (CD)-ROM, and a storage device such as a hard disk built into a computer system. Furthermore, the "computer-readable recording medium" is assumed to include one that holds a program for a certain period of time, such as volatile memory inside a computer system serves as a server or a client when the program is transmitted via a network such as the Internet or a communication line such as a telephone line.

In addition, the program described above may be transmitted from a computer system storing the program in a storage device or the like via a transmission medium, or to another computer system using transmission waves in a transmission medium. Here, the "transmission medium" for transmitting a program refers to a medium having a function of transmitting information, like a network such as the Internet or a communication line such as a telephone line.

In addition, the above-described program may be to realize some of the functions described above. Furthermore, the above-described program can be a so-called differential file or a differential program that can realize the above-described functions in combination with a program already recorded in the computer system.

What is claimed is:
1. An information processing system, comprising:
an electronic apparatus that includes a detector configured to detect one or more pieces of data indicating an exercise type of a user and that is attached to in-use shoes used by the user; and
an information processing device that includes an identification part configured to identify the exercise type of the user based on the one or more pieces of data detected by the detector and an output part configured to output applicable shoe information about applicable shoes corresponding to the exercise type identified by the identification part, wherein
the detector includes a third detector configured to detect position information indicating a position of the electronic apparatus,
the identification part identifies, as a target region, a region where the user performed exercise, based on the position information detected by the detector, and identifies a shop that sells shoes in the identified target region as a target shop, and
the output part outputs the applicable shoe information about the applicable shoes sold at the target shop.
2. The information processing system according to claim 1, wherein
the detector includes a first detector configured to detect data indicating a speed of movement as one of the one or more pieces of data and to detect acceleration as data indicating the speed as one of the one or more pieces of data.

3. The information processing system according to claim 1, wherein
the detector includes a second detector configured to detect data indicating an inclination of a road surface as one of the one or more pieces of data.

4. The information processing system according to claim 3, wherein
the second detector detects an angular velocity as data indicating the inclination.

5. The information processing system according to claim 1, wherein,
when the identification part determines that the exercise type of the user is a first exercise type, the output part outputs, as the applicable shoe information, first applicable shoe information about first applicable shoes corresponding to the first exercise type, and when the identification part determines that the exercise type of the user is a second exercise type, the output part outputs, as the applicable shoe information, second applicable shoe information about second applicable shoes corresponding to the second exercise type.

6. The information processing system according to claim 5, wherein
the first applicable shoe information is information indicating a coupon for discount on a sales price of the first applicable shoes,
the second applicable shoe information is information indicating a coupon for discount on a sales price of the second applicable shoes, and
a discount amount of the coupon indicated by the second applicable shoe information is different from a discount amount of the coupon indicated by the first applicable shoe information.

7. The information processing system according to claim 1, wherein
the identification part identifies the exercise type of the user based on the one or more pieces of data and the position information that are detected by the detector.

8. The information processing system according to claim 1, wherein
the identification part calculates, based on the position information detected by the detector, a distance moved by the user in respective two or more regions where the user performed exercise, identifies, as the target region from among the two or more regions, a region where the user moved a longest distance, and identifies the target shop in the identified target region.

9. The information processing system according to claim 1, wherein
the output part calculates, based on the position information detected by the detector, a distance moved by the user, and outputs the applicable shoe information when the calculated distance is equal to or greater than a predetermined first threshold.

10. The information processing system according to claim 1, wherein, when the identification part identifies two or more exercise types as the exercise type of the user, the output part outputs the applicable shoe information for an exercise type satisfying a predetermined condition, among the two or more exercise types, and
the predetermined condition is any of conditions that the user performed exercise a longest period of time, that the user moved a longest distance, and that the user performed exercise a longest period of time and moved a longest distance.

11. The information processing system according to claim 1, wherein
the output part outputs the applicable shoe information when a predetermined output condition is satisfied, and
the predetermined output condition includes that a repulsive force of the in-use shoes becomes smaller than a predetermined second threshold.

12. The information processing system according to claim 11, wherein
the predetermined output condition includes that a current season is a season associated with the exercise type identified by the identification part.

13. The information processing system according to claim 11, wherein
the predetermined output condition includes that a total movement distance of the user using the in-use shoes is equal to or greater than a usable distance of the in-use shoes.

14. The information processing system according to claim 11, wherein the predetermined output condition includes that a total exercise time of the user using the in-use shoes is equal to or greater than a usable period of time of the in-use shoes.

15. The information processing system according to claim 11, wherein the predetermined output condition includes that the user finishes exercise.

16. The information processing system according to claim 11, wherein the predetermined output condition includes that the information processing device receives information indicating that there is a problem with the in-use shoes.

17. An information processing method of an information processing system including an electronic apparatus configured to be attached to in-use shoes used by a user, and an information processing device configured to transmit and receive information to and from the electronic apparatus, the information processing method comprising:
a first step of detecting, by the electronic apparatus, one or more pieces of data indicating an exercise type of the user;
a second step of identifying, by the information processing device, the exercise type of the user based on the one or more pieces of data detected in the first step; and
a third step of outputting, by the information processing device, applicable shoe information about applicable shoes corresponding to the exercise type identified in the second step, wherein
the first step further comprises detecting position information indicating a position of the electronic apparatus,
the second step further comprises identifying, as a target region, a region where the user performed exercise, based on the detected position information, and identifying a shop that sells shoes in the identified target region as a target shop, and
the third step further comprises outputting the applicable shoe information about the applicable shoes sold at the target shop.

18. A non-transitory computer-readable storage medium storing a program, the program causing a computer of an information processing system to execute a first step, a second step, and a third step,
the information processing system including
an electronic apparatus configured to be attached to in-use shoes used by a user, and an information processing device configured to transmit and receive information to and from the electronic apparatus, the first step including detecting one or more pieces of data indicating an exercise type of the user, the second step including identifying the exercise type of the user, based on the one or more pieces of data detected in the first step, the third step including outputting applicable shoe information about applicable shoes corresponding to the exercise type identified in the second step, wherein the first step further comprises detecting position information indicating a position of the electronic apparatus, the second step further comprises identifying, as a target region, a region where the user performed exercise, based on the detected position information, and identifying a shop that sells shoes in the identified target region as a target shop, and the third step further comprises outputting the applicable shoe information about the applicable shoes sold at the target shop.

* * * * *